United States Patent [19]

Benson et al.

[11] 4,452,656
[45] Jun. 5, 1984

[54] METHOD AND APPARATUS FOR MAKING PLASTIC SCREEN PANELS

[75] Inventors: Henry E. Benson, Long Lake; Raymond A. Koehler, Anoka, both of Minn.

[73] Assignee: UOP Inc., Des Plaines, Ill.

[21] Appl. No.: 407,970

[22] Filed: Aug. 13, 1982

[51] Int. Cl.³ .................. B07B 1/46; B32B 1/00; B31C 13/00
[52] U.S. Cl. .................. 156/174; 156/296; 156/309.6; 156/309.9; 156/434; 156/552; 209/400; 209/401
[58] Field of Search .............. 156/173, 174, 296, 433, 156/434, 175, 561, 309.6, 309.9, 162, 166, 552; 210/497.1, 498, 499

[56] References Cited

U.S. PATENT DOCUMENTS

| | | | |
|---|---|---|---|
| 2,046,458 | 7/1936 | Johnson | 166/8 |
| 3,031,360 | 4/1962 | Currier | 156/167 |
| 3,391,041 | 7/1968 | Moore | 156/174 |
| 3,964,959 | 6/1976 | Adams | 156/433 |
| 4,032,688 | 6/1977 | Pull | 428/36 |
| 4,295,918 | 10/1981 | Benson et al. | 156/434 |
| 4,330,349 | 5/1982 | Swift et al. | 156/72 |

Primary Examiner—Michael W. Ball
Assistant Examiner—Gary B. Binstock
Attorney, Agent, or Firm—James R. Hoatson, Jr.; Barry L. Clark; William H. Page, II

[57] ABSTRACT

Apparatus for making plastic screen panels, and especially abrasion-resistant mining screens, includes a large rotary screen drum member on which an extruded, profiled cross-section screen surface-forming wire is helically wound at a pitch which will produce the desired screen slot width. Immediately adjacent the drum member is a rod-positioning mechanism from which a plurality of screen panel support rods are sequentially fed from a stack and welded to the wires on the drum surface in a direction parallel to the drum axis and transverse to the surface wires. The welding is done with a double-edged heater bar which is temporarily placed in contact with the rod and drum before the rod is forced against the drum. The screen drum is indexed after each support rod is attached to it by an angular amount sufficient to provide the desired spacing on the finished panel. After all the rods are attached to the wire-covered drum, the wires are severed along a line parallel to the drum axis and the now-finished panel is removed and used as is or preferably is cut to form several smaller panels.

5 Claims, 11 Drawing Figures

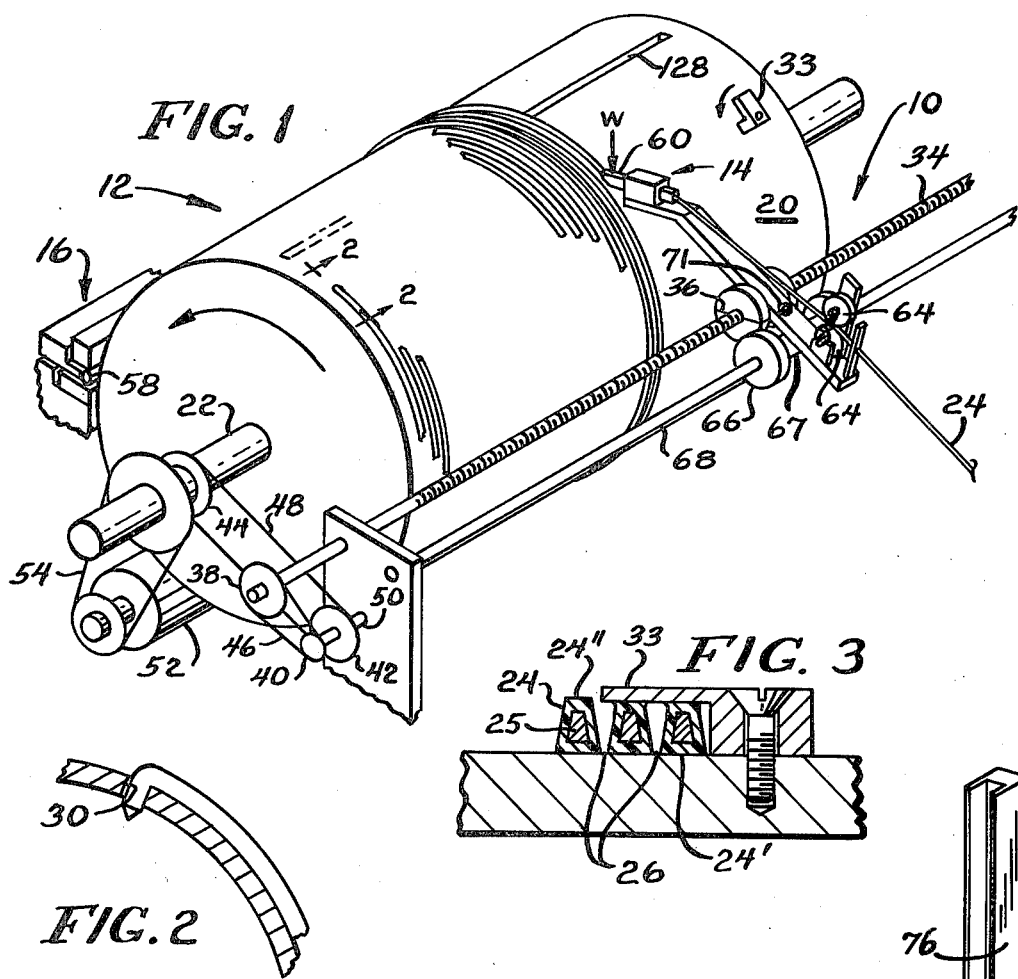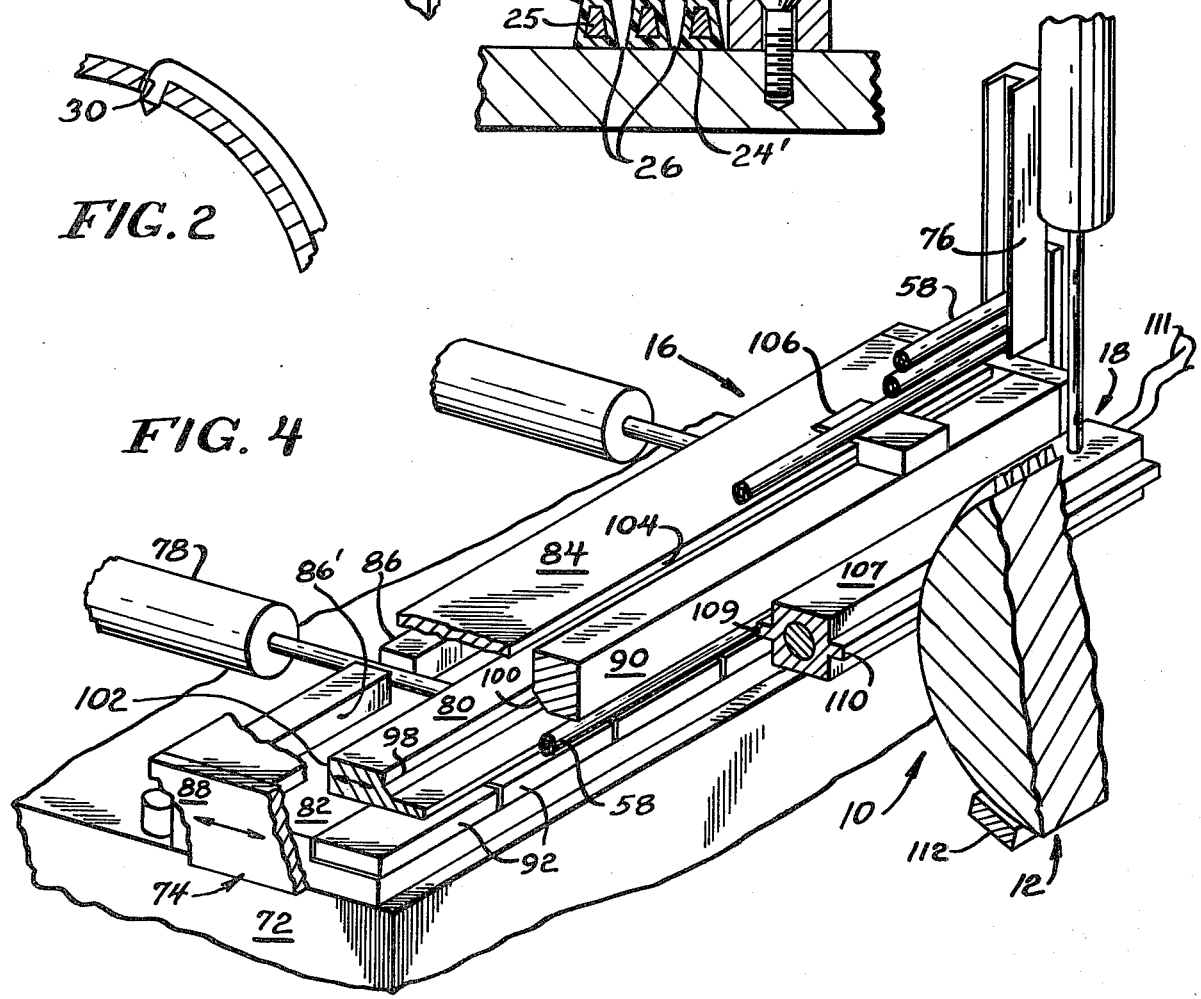

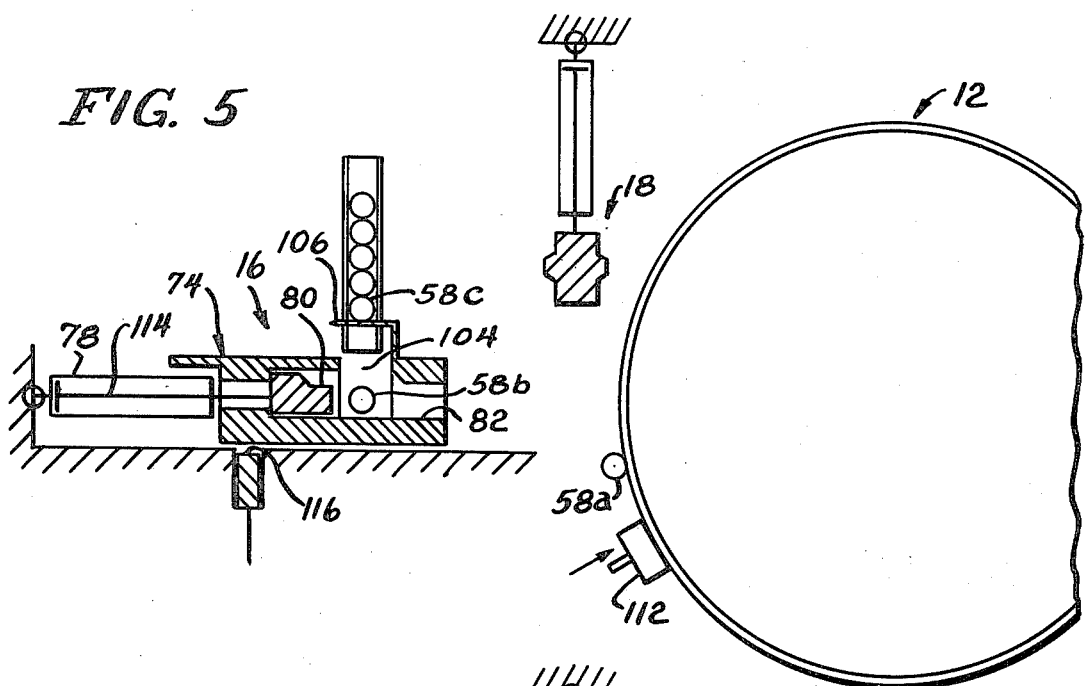
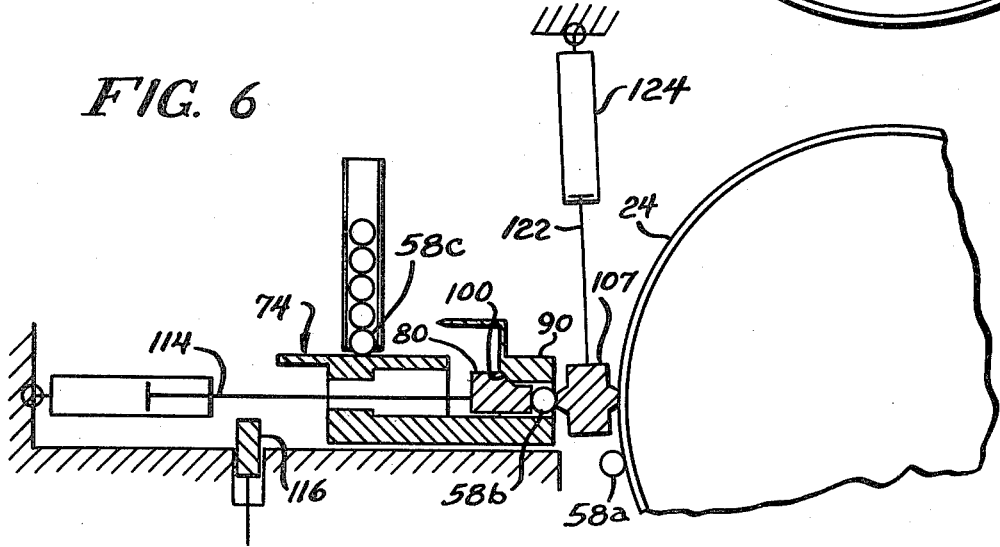
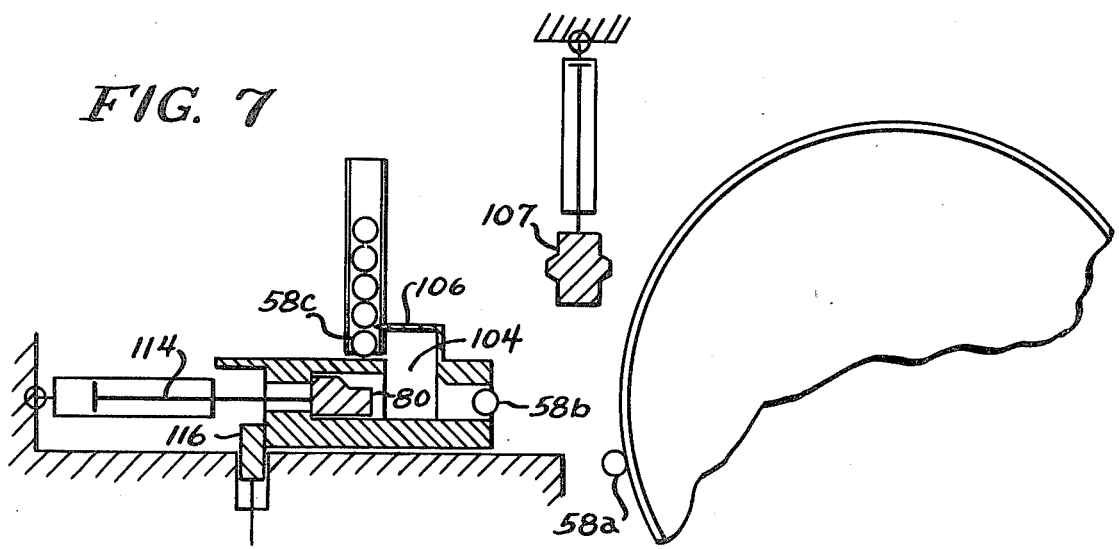

METHOD AND APPARATUS FOR MAKING PLASTIC SCREEN PANELS

BACKGROUND OF THE INVENTION

The invention relates to the making of plastic screen panels, and particularly to the making of abrasion-resistant, urethane surfaced screen panels which have substantial utility in the mining industry. The invention is an improvement upon the apparatus described in Benson et al U.S. Pat. No. 4,295,918, said patent being assigned to a common assignee and its subjct matter is incorporated by reference herein. The screen panel per se is described in copending application Ser. No. 301,546 filed Sept. 14, 1981, now U.S. Pat. No. 4,374,169, which is also assigned to a common assignee and which is also incorporated by reference herein.

The aforesaid Benson et al U.S. Pat. No. 4,295,918 discloses an apparatus for producing flat screen panels from profiled screen surface wires and transverse support rods. The wires and rods each have an extruded urethane surface which permits them to be fusion-welded to each other. The patented apparatus produces an excellent screen, but is very labor intensive in that each of the many profiled screen wires which form the screen surface must be individually loaded in a specific orientation into one of a plurality of closely spaced annular grooves. The grooves are formed in one of a pair of cooperating feed rolls, one of which is driven. The grooves serve to maintain the wires in parallel alignment as they are pushed to and through the welding station. At the welding station, the wires must also be initially positioned in grooves in a positioning or anvil roll which backs them up as a support rod is brought into pressure contact with them after the rod and wires have been heated by a heater bar. The time required to thread all the surface profile wires would not be too significant if the wire were to be supplied in a large reel to each groove. However, since the screen would typically be formed in a 42-inch width, and thus might have 260 or more wires, it is generally preferred to provide the wire in relatively short cut lengths of perhaps 20 feet. Such short lengths cause the threading time to become a substantial proportion of the overall screen manufacturing time. Furthermore, since both one of the feed rolls and the positioning or anvil roll must each be grooved, it is necessary to have different sets of rolls for every wire dimension and slot spacing which is to be produced.

SUMMARY OF THE INVENTION

It is among the objects of the present invention to provide an apparatus for making plastic screen panels which can be loaded and operated much more quickly, simply and economically than prior art devices. It is a further object to provide an assembly apparatus for screen panels which is capable of utilizing a wide variety of wire sizes and of producing a wide range of slot sizes without requiring the use of expensive grooved guide and anvil rolls.

These and other objects and advantages are provided by the apparatus of the present invention in which a single screen wire is fed directly from a supply coil or from an extrusion die to a large diameter rotatable drum. The lead end of the surface profile wire is secured to the drum by being placed in a radial aperture in the drum surface adjacent one end thereof. The wire is passed through a wire guide which holds it tangent to the surface and which includes tensioning rolls so that the wire is slightly stretched as it is wrapped about the drum. It is possible to specifically groove the drum to accept the wire and to provide a predetermined spacing. However, we have found that by placing the extruded flat surface of a urethane-surfaced profile wire against the drum and by taking advantage of its elastomeric nature, it is possible for hundreds of revolutions of it to be precisely wrapped and maintained at a predetermined spacing on the drum. We have also found that the wire can be caused to remain in place on the drum as the support rods are later welded to its outer surface. The support rods are stacked prior to assembly in a dispensing apparatus which feeds them individually into a lightly clamped position adjacent the drum wherein approximately one-half of their surface along their entire length is exposed. At this point, a double-sided heater bar is lowered between the partially exposed rod and the drum. The dispensing apparatus then pushes the rod against the heater bar and the heater bar against the screen wires on the drum until both are softened. The dispenser pusher then retracts slightly to permit the heater bar to be removed and then advances to force the softened rod against the softened profile wires to produce a weld. After an appropriate cooling period, the dispenser pusher is withdrawn to drop another support rod into feeding position and the drum is then indexed to the next position.

After a number of cycles of the support rod dispensing mechanism have been completed in order to complete the formation of the screen panel being produced, the screen wires are severed transversely over a longitudinal slot in the drum surface. The panel can then be easily removed and laid flat since the wires are flexible. Further transverse cuts can then be made to break the initially formed large panel into two or more smaller ones. For example, by forming the drum to have a forming length of 42 inches and an outer diameter of $12/\pi$ feet, the large panel can be cut into three panels which are of a 42 inch $\times$ 4 foot size.

BRIEF DESCRIPTION OF THE DRAWINGS

FIG. 1 is an isometric view illustrating the step of winding the surface profile wire about the surface of a drum;

FIG. 2 is an axially transverse sectional view taken on line 2—2 of FIG. 1 showing the anchoring of the lead end of the surface profile wire to the drum;

FIG. 3 is a longitudinal sectional view showing the anchoring of the trailing end of the surface profile wire to the drum;

FIG. 4 is an isometric view of the support rod positioning mechanism and the heater bar mechanism;

FIGS. 5–9 are generally schematic views illustrating the sequence of operation of positioning the support bars and welding them to the drum.

DETAILED DESCRIPTION OF THE INVENTION

Figure 8:
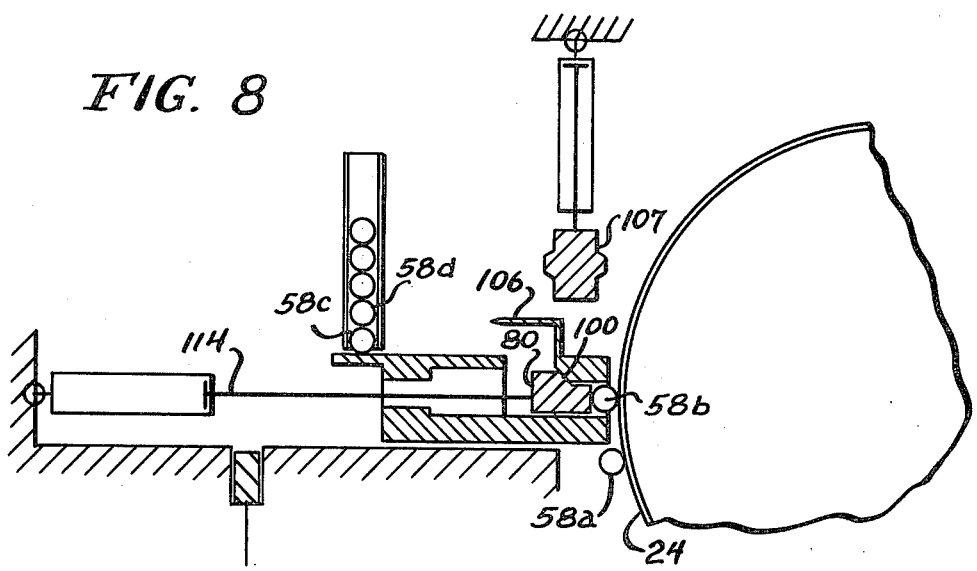

Referring to FIGS. 1 and 4, the improved screen panel-making apparatus is indicated generally at 10 and includes four principal components. These are: the screen drum 12; the surface profile loading guide 14; the support rod positioning mechanism 16 and the heater bar mechanism 18.

The screen drum 12 is preferably fabricated from a hollow cylinder 20 which is mounted on an axial shaft 22 for rotation in bearings (not shown). The surface of the cylinder 20 should be machined or otherwise formed quite accurately so as to eliminate any eccentricities which could make it difficult for a plurality of wraps of a helically wound surface profile wire 24 to be frictionally retained by the drum surface with a fairly uniform slot spacing 26 between wraps. The first step of making a screen panel consists of winding a number of wraps of a surface profile wire 24 about the drum cylinder 20 in a helical manner until the desired panel width is reached. The wire could be supplied from a coil or an extruder and preferably has its leading end bent over and locked in an aperture 30 in the drum surface as shown in FIG. 2. The trailing end may be clamped against the surface of the drum by a clamping mechanism 33, as shown in FIG. 3, to maintain tension in the wire. A uniform winding pitch is obtained by means of a lead screw 34 which drives a split nut member 36 which supports the surface profile loading guide assembly 14. Depending upon the slot width 26 desired, and thus the winding pitch which is required, the lead screw is connected for rotation relative to the drum shaft 22 by various sized sprockets 38, 40, 42 and 44 and sprocket chains 46, 48. Variations in winding pitch are most easily made by varying the relative sizes of the sprocket member 40, 42 which are free to rotate on an idler shaft 50 but fixed so as to rotate with each other. Power for driving the screen drum 12 and the lead screw 34 is provided by a motor 52 and drive belt 54. The surface profile wire 24 preferably has a relatively rigid core 25 of plastic or metal and an extruded, less rigid, elastomeric urethane surface which will permit the resulting panel to resist abrasion. The presence of the core material makes it possible for the wraps of wire to be wrapped and maintained under tension while the elastomeric surface permits them to retain a tight, very precise engagement with the drum surface 20 until the screen panel is completed by the welding thereto of a plurality of surface rods 58. The surface profile wire 24 preferably has the trapezoidal shape shown in FIG. 3 to prevent clogging of the slots 26 during use and is wrapped with its wider wear surface 24' touching the drum. A guide tube 60, which comprises a portion of the loading guide 14, has an internal shape complementary to the wire profile and is forced against the surface of the drum by a weight member symbolized by an arrow and the symbol "W". Winding tension for the wire is provided by a pair of spring-loaded rolls 64 which engage its surfaces 24', 24". A pair of sliding elements 66, which are joined by a sleeve 67 which is attached to a rear portion of the profile loading guide 14, are adapted to ride on a smooth guide rod 68 so as to stabilize the movement of the loading guide as it is traversed over the length of the drum surface by the lead screw 34 and split nut member 36.

Once the surface profile wire 24 has been completely wound on to the drum and its end locked by clamping member 33, it is cut free of its supply. The guide tube 60 can be pivoted away from the drum during the operation of welding the support rods 58 since the profile loading guide is affixed to the upper half of the split nut 36 and also to the sleeve 67. The lower half of the split nut is attached to a plate (not shown) which is hinged to the sleeve 67. The plate and the upper portions of the profile loading guide are joined relative to each other by a fastener 71 when the split nut 36 is in engagement with the lead screw 34.

Figure 9:
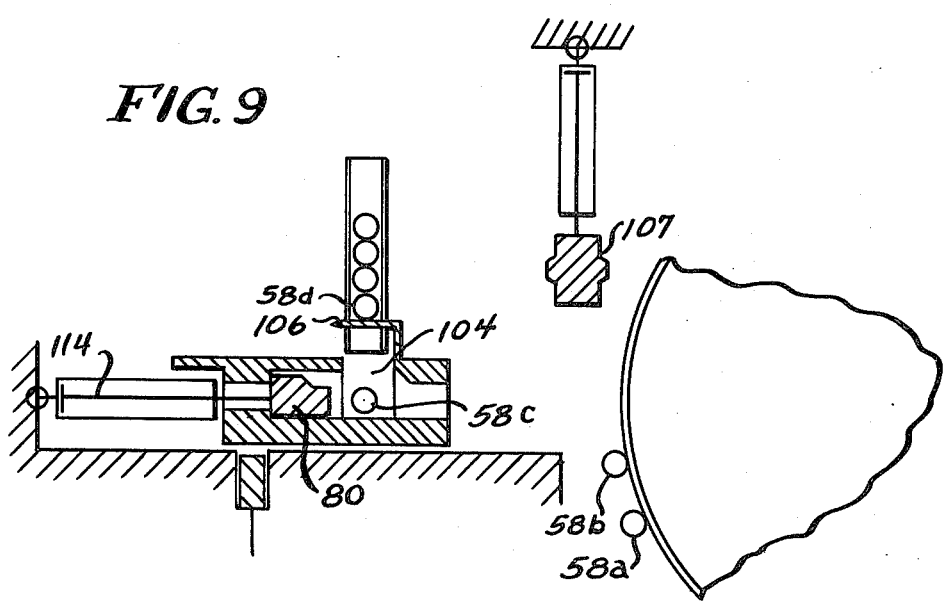
Figure 10:
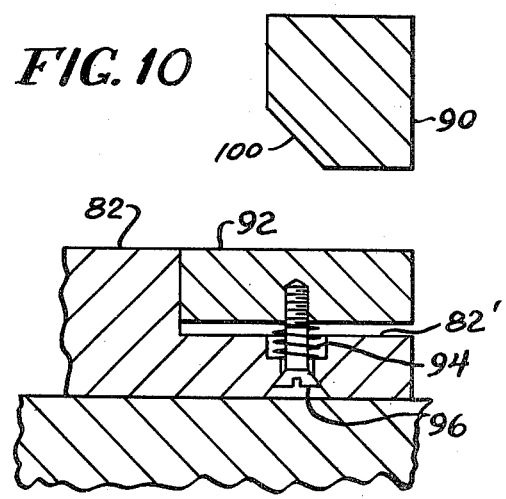
FIGS. 10 and 11 are axially transverse sectional views illustrating the relationship of the positioning mechanism and a support bar.
Figure 11:
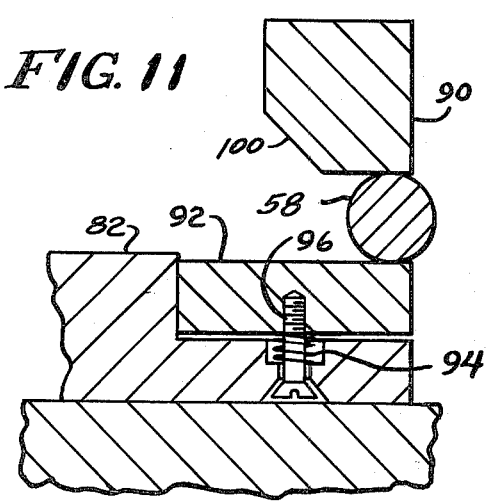

The support rods 58 are fused or welded to the narrow outer surfaces 24" of the surface profile wires 24 at a plurality of spaced angular locations around the circumference of the drum. The number required depends on how much strength and rigidity is required for the resulting screen panel. The support rods are affixed to the profile wires by the support rod positioning mechanism 16 as shown most clearly in FIG. 4. The fixed base of the positioning mechanism is indicated at 72. A slide assembly 74 is mounted for movement on the base 72 relative to the drum 12 and relative to a rack 76 carried by the base 72 which contains a supply of support rods. The slide assembly 74 is moved in a "lost motion" fashion by a pair of air cylinders 78 which are connected to a pusher bar element 80. The slide assembly 74 includes a number of integrally connected elements including a lower plate 82, an upper plate 84, a rear wall member 86, end walls 88, and a forward upper rod retaining jaw member 90. A series of lower jaw members 92 are resiliently mounted for vertical movement relative to a recessed portion 82' of the lower plate 82 by means of springs 94 and threaded fasteners 96 as shown in FIGS. 10 and 11. Forward movement of the slide assembly 74 can take place as in FIG. 6, for example, when the raised forward shoulder portion 98 of pusher bar 80 contacts the lower rearward face 100 of the upper jaw member 90. Rearward movement of the slide assembly 74 can take place, as in FIG. 9, for example, when a rear surface 102 of the pusher bar 80 engages the forward face 86' of the rear wall 86. The upper jaw member 90 and the upper plate member 84 are horizontally separated from each other by an elongated slot 104 which is at least as wide as the diameter of the support rods 58 which must pass through it. Overlying the slot 104 and spaced above it by the thickness of the support rod is a retaining finger member 106 which is mounted at its forward end to the upper jaw member 90. The operation of the aforementioned elements of the support positioning mechanism 16 will be readily evident as the sequence of operations of assembling support rods 58 to the surface profile 24 is hereinafter explained in connection with the schematic diagrams of FIGS. 5 through 9. The movement of the heater bar mechanism 18 will also be explained. However, as seen in FIG. 4, the heater bar 107 includes an internal resistance heating element 108 which causes its rear and front edges 109, 110 to become sufficiently hot that they will melt or soften the urethane surfaced rods 58 and wires 24, respectively. Electric current is brought to the element 108 by lead wires 111. To minimize sticking, the edges 109, 110 are preferably coated with a polymer material such as a fluorinated hydrocarbon.

After the surface profile wire 24 is wrapped on the drum surface 20 and its trailing end has been engaged by clamp 33, the operation of welding the support rods 58 longitudinally of the drum axis and transversely to the wraps of wire 24 may commence. The sequence of operation of the support rod positioning mechanism 16 can be seen by reference to FIGS. 5 through 9. In FIG. 5, the screen drum 12 is shown as being locked against rotation by a brake member 112 which may be actuated each time a rod is to be welded to it. After each rod is welded, the brake is released from engagement so the drum can be indexed to the next position at which a support rod is to be attached. The indexing mechanism is not shown but could be manual or automatic.

In FIG. 5, a first support rod 58a has already been welded and a second rod 58b is shown as resting on the lower plate 82 of the slide assembly 74 under the slot 104. The pusher bar 80 is in its extreme left retracted position to which it has been moved by piston rods 114 of the air cylinders 78. In this position, the slide assembly has passed over a retracted, solenoid actuated stop member 116, thus permitting the retaining finger 106 to move under the support rod 58c to prevent it from falling through the slot 104. The heater bar mechanism 18 is kept heated but is located in its inoperative upper position.

FIG. 6 illustrates the step of simultaneously heating both the rod 58b and a line along the wraps of surface profile wire 24. The heater bar 107 is first moved down to its lower operative position by piston rods 122 which extend from their normally retracted position inside a pair of pivoted cylinders 124. Once the heater bar 107 is in its operative position, the piston rods 14 are actuated to cause the pusher member 80 to first move to the right until its forward surface 98 engages surface 100 of the upper jaw member 90 and then continue moving to carry the slide assembly 74 to the right. This latter movement presses the rod 58b against the hot heater bar 107 which, in turn, pivots the heater bar and forces it against the wraps of the surface profile wire 24. This latter position is maintained for a sufficient time interval to properly soften the rod 58b and the wire 24. Before the slide assembly is brought back to the left by the piston rod 114, the stop member 116 is caused to rise so that it will stop the slide assembly when it is moved to its FIG. 7 position. While the slide assembly is being retracted, the heater bar 107 is quickly lifted to its upper inoperative position. The piston rod 114 is then immediately actuated to force the pusher bar 80 to its extreme right position shown in FIG. 8 wherein the heated rod 58b and the heated wraps of surface profile wire 24 are fused together under pressure. The FIG. 8 position is maintained while the fused members start to cool and the stop member 116 is retracted. After an appropriate cooling time, the slide is moved by piston rod 114 to its extreme left FIG. 9 position. This movement causes the retaining finger 106 to pass under the support rod 58d and retain the stack of rods above it as the rod 58c which is under it falls through the slot 104 to replace the rod 58b that was welded to the wires in FIG. 8. The drum 12 is then indexed to a new position and the welding cycle is repeated until the drum has as many rods welded to it as are required. The resulting circular panel which is formed on the drum may now be severed longitudinally by a hot knife or by passing a saw blade through the wire wraps and into a slot 128 (FIG. 1) in the drum surface.

Since FIGS. 5–9 are somewhat schematic, FIGS. 10 and 11 have been provided to better illustrate how the rods 58 are retained by the jaws 90, 92 in their FIG. 7 position. The movable jaw 92 is normally closer to the fixed jaw 90 than the thickness of a rod 58, as can be seen in FIG. 10. However, when a rod is pushed by pusher 80 from its FIG. 5 to its FIG. 6 position, it will force the movable jaw 92 down against spring 94 as it moves past the juncture of the chamfered rear face 100 and the lower horizontal surface of the fixed jaw 90. The resilient retaining force thus produced between the jaws and the support rod is sufficient to retain the rod as the slide 74 moves, but insufficient to prevent the rod being transferred from the jaws to the drum after the weld produced in FIG. 8 has solidified.

Although a particular embodiment of a rod-dispensing mechanism has been disclosed in which the supply of support rods is a precut stack of rods, it is also contemplated that the supply could be a coil from which individual rods could be severed prior to being welded.

We claim as our invention:

1. A method of forming a slotted thermoplastic screen panel having tapered slots comprising the steps of helically winding a strand of profiled surface wire having a flat elastomeric working surface and converging side surfaces at a uniform pitch greater than the width of the wire about a smooth-surfaced drum in a plurality of wraps, said winding being done under tension and with said elastomeric flat wire surface in engagement with said drum; fixing the ends of said strand of wire relative to said drum to maintain tension in said strand; heating one longitudinal side surface of the first of a plurality of thermoplastic-surfaced rigid support rods and a longitudinal strip segment of the wire wraps on the drum surface where said first support rod is to be welded, to a softened state; forcing the heated side surface of said support rod into engagement with said strip segment and holding it until fusion takes place; indexing the drum and repeating said heating and forcing steps until the remainder of said plurality of rigid support rods are welded at spaced increments around the circumference of said drum; severing said wire wraps along a line parallel to said support rods; and removing said screen panel from said drum.

2. The method of claim 1 wherein said longitudinal side surface of said first support rod and said longitudinal strip segment of the wire wraps are heated simultaneously.

3. An assembly apparatus for thermally welding a plurality of thermoplastic-surfaced rigid support rods to a plurality of extruded thermoplastic-surfaced profile wires, said apparatus including a rotatable screen drum; means on said screen drum for anchoring the ends of at least one length of extruded surface profile wire having a flat bottom surface and tapered side surfaces and which is adapted to be helically wrapped about the drum under tension with said flat surface engaging the drum so as to provide a space or slot of uniform width between wraps; a support rod positioning mechanism, said positioning mechanism including means for successively removing a first rigid support rod from a supply thereof and positioning it with a longitudinal surface exposed adjacent a first longitudinal surface portion of said screen drum and parallel to the axis thereof; heater bar means including first and second longitudinal heated portions mounted for movement into and out of a heating position between said exposed longitudinal surface of said first support rod and said first longitudinal surface portion of said screen drum; means for forcing the exposed longitudinal surface of said first support rod into engagement with said first heated portion of said heater bar means in the heating position thereof while the second heated portion of said heater bar means is forced into engagement with said first longitudinal surface portion of said screen drum; means to retract said heater bar means from its heating position to its inoperative position; means operative when the heater bar means is in its inoperative position to force the exposed longitudinal portion of said first support rod into said first longitudinal surface portion of said screen drum means and maintain it in pressure contact until said first support rod is fused in welded relationship to a plurality of screen wire wraps which overlie the screen drum; and means to index said screen drum so that second and additional support rods can be fused to the screen wire wraps at a plurality of locations around the screen drum.

4. Apparatus in accordance with claim 3 wherein the surface of said screen drum is smooth in the region wherein it is helically wrapped with said thermoplastic-surfaced profile wire.

5. Apparatus in accordance with claim 3 wherein said support rod positioning mechanism includes a pair of guiding channels for supporting the ends of a stack of support rods, said positioning mechanism further including a reciprocable support plate and a support clip attached to it at a location which is positioned above it by the thickness of one support rod, said support plate having a slot therein located under said support clip so as to permit the lowest support rod in a stack to pass therethrough and into contact with a lower support plate when the clip is moved against and through the stack.

* * * * *